(12) United States Patent
Stamps et al.

(10) Patent No.: US 7,400,119 B1
(45) Date of Patent: *Jul. 15, 2008

(54) MODULAR HIGH VOLTAGE POWER SUPPLY FOR CHEMICAL ANALYSIS

(75) Inventors: James F. Stamps, Livermore, CA (US);
Daniel D. Yee, Dublin, CA (US)

(73) Assignee: Sandia Corporation, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/635,288

(22) Filed: Dec. 7, 2006

Related U.S. Application Data

(62) Division of application No. 10/414,979, filed on Apr. 16, 2003, now Pat. No. 7,161,334.

(51) Int. Cl.
*G05F 1/40* (2006.01)
*G05F 5/00* (2006.01)

(52) U.S. Cl. ........................ 323/266; 323/275; 323/283; 323/299; 363/146

(58) Field of Classification Search ................... 365/51; 361/728–733, 785, 788, 791; 320/148; 326/33, 326/34; 330/296; 307/44, 45, 60, 86
See application file for complete search history.

(56) References Cited

U.S. PATENT DOCUMENTS

| 4,354,148 | A |   | 10/1982 | Tada |
|---|---|---|---|---|
| 5,154,172 | A | * | 10/1992 | Terry et al. ................. 323/266 |
| 5,846,396 | A |   | 12/1998 | Zanzucchi |
| 5,977,796 | A |   | 11/1999 | Gabara |
| 6,083,763 | A |   | 7/2000 | Balch |
| 6,224,728 | B1 |   | 5/2001 | Obnorny |
| 6,358,387 | B1 |   | 3/2002 | Kopf-Sill |
| 6,788,150 | B2 |   | 9/2004 | Joly |

* cited by examiner

*Primary Examiner*—Jessica Han
(74) *Attorney, Agent, or Firm*—Cascio, Schmoyer & Zervas

(57) ABSTRACT

A high voltage power supply for use in a system such as a microfluidics system, uses a DC-DC converter in parallel with a voltage-controlled resistor. A feedback circuit provides a control signal for the DC-DC converter and voltage-controlled resistor so as to regulate the output voltage of the high voltage power supply, as well as, to sink or source current from the high voltage supply.

13 Claims, 10 Drawing Sheets

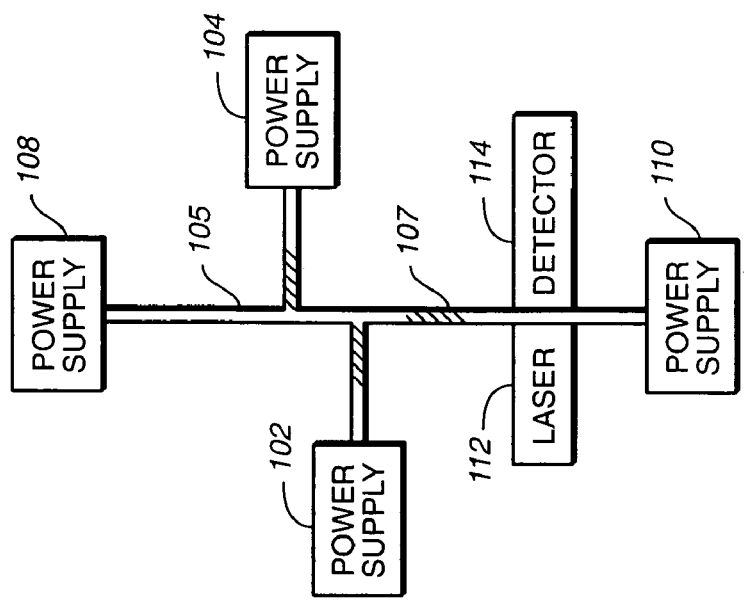
FIG._1A
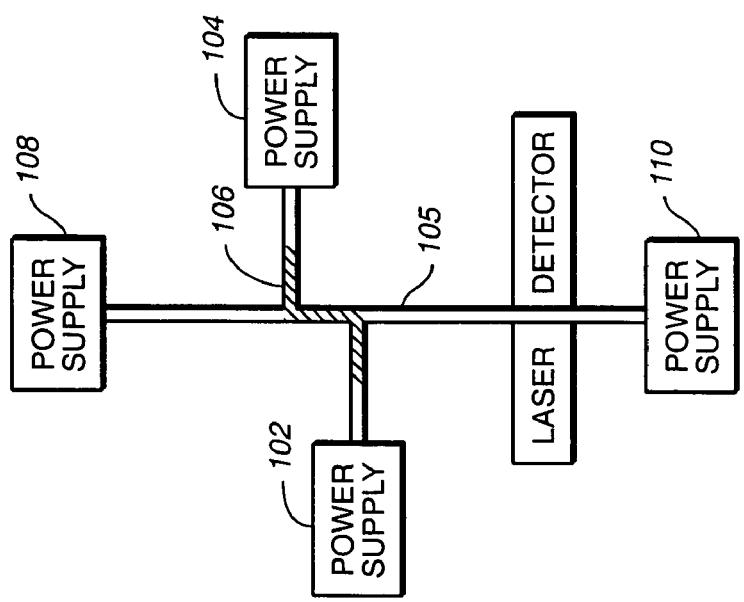
FIG._1B

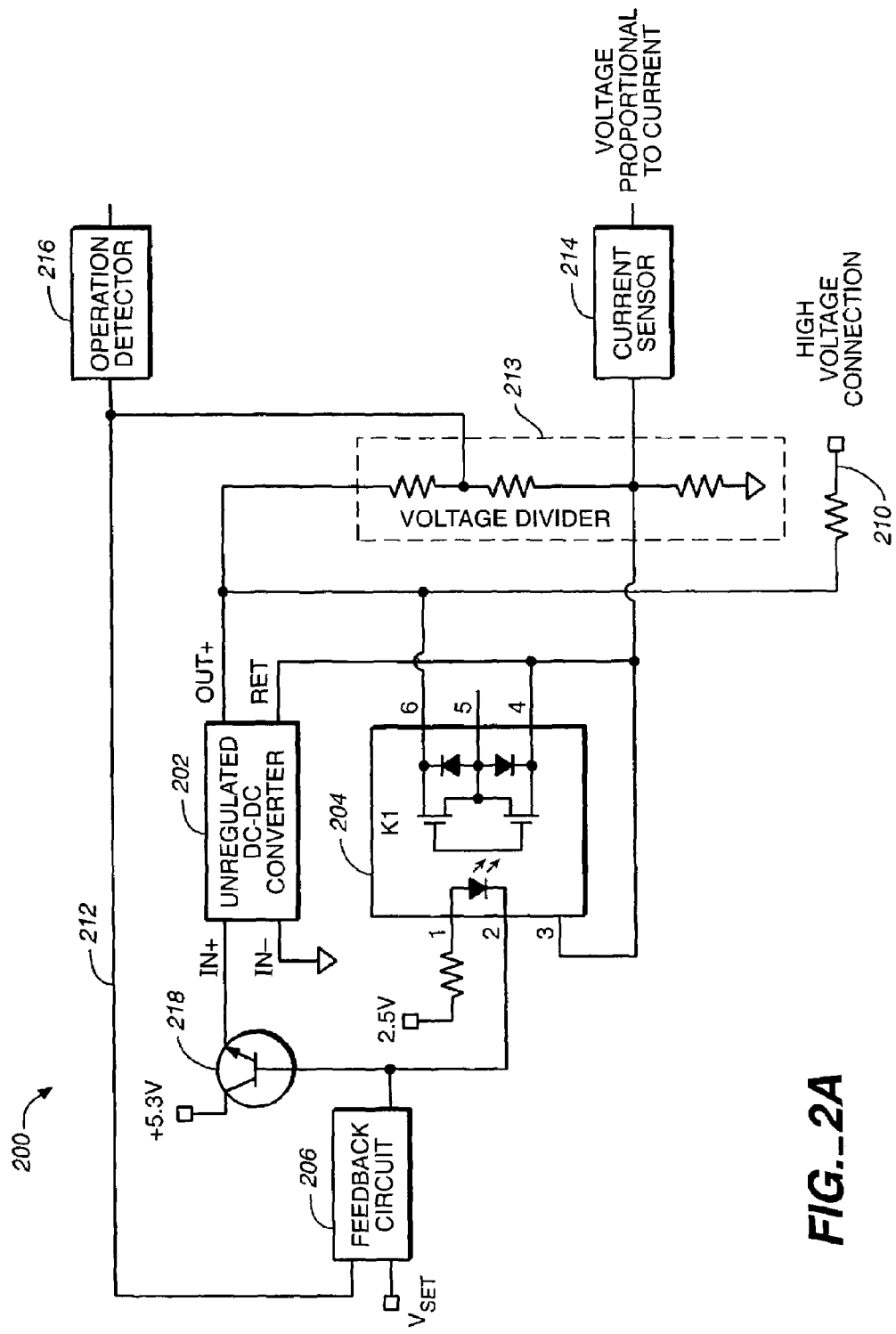
FIG._2A

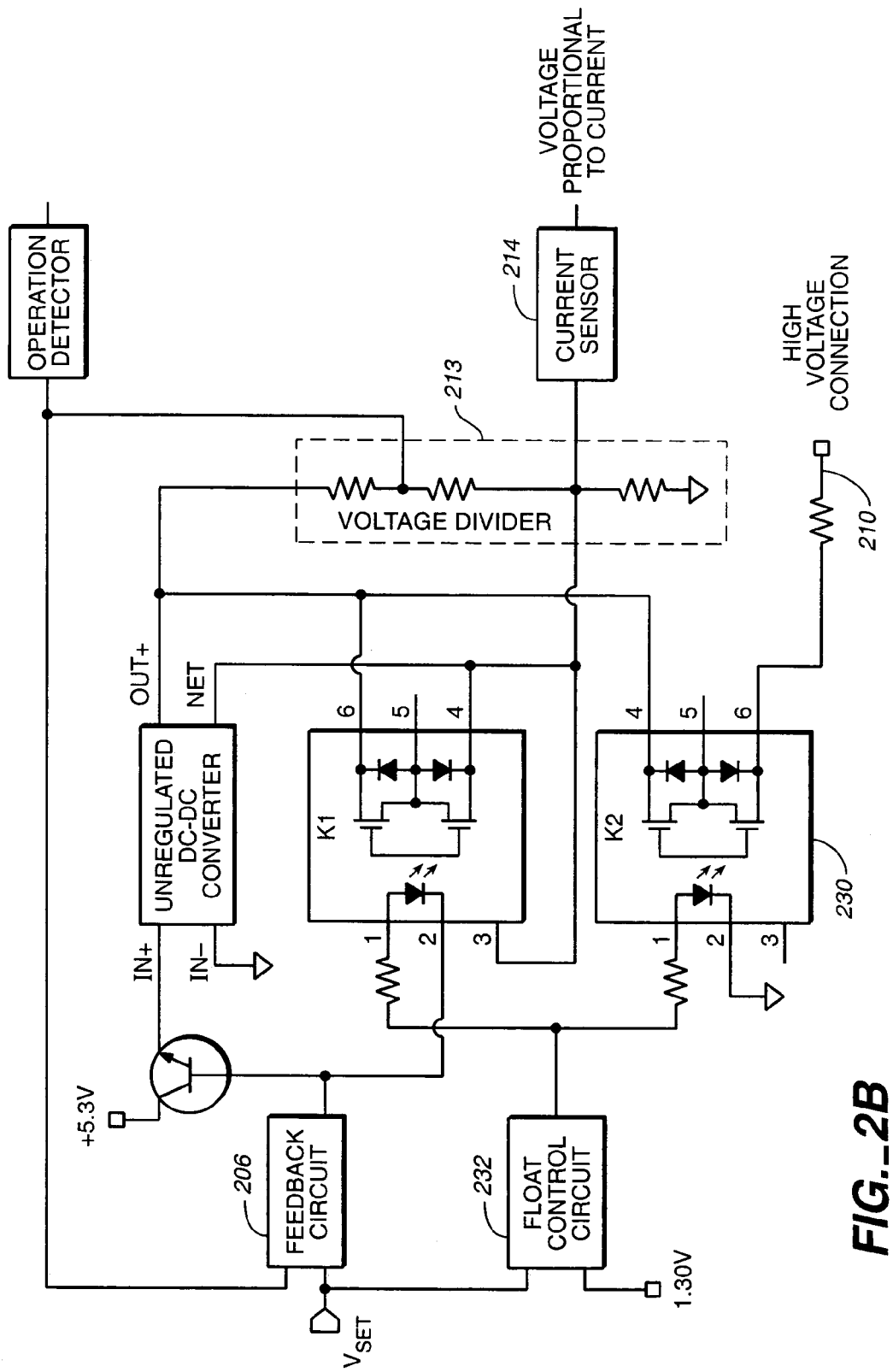
FIG._2B

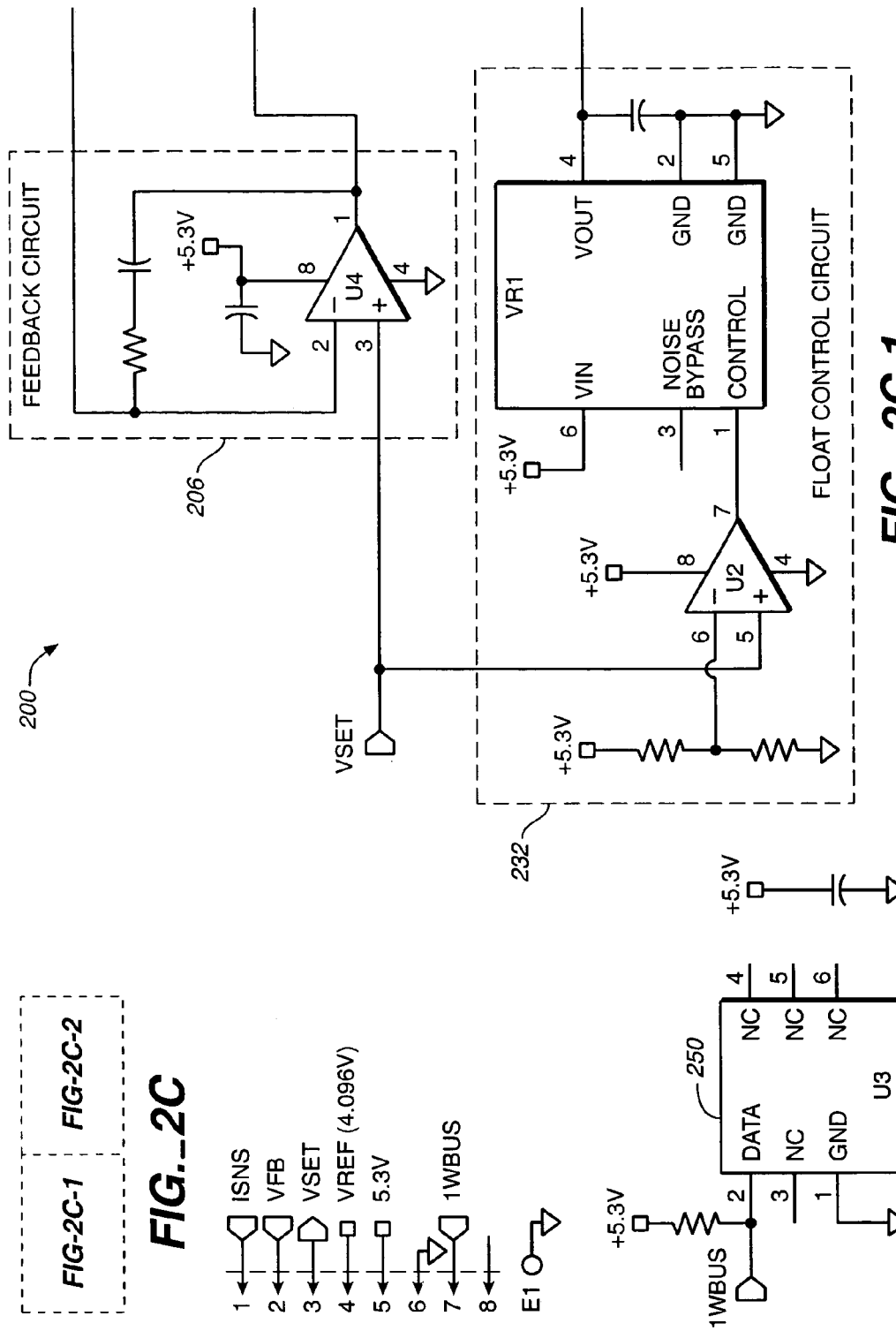

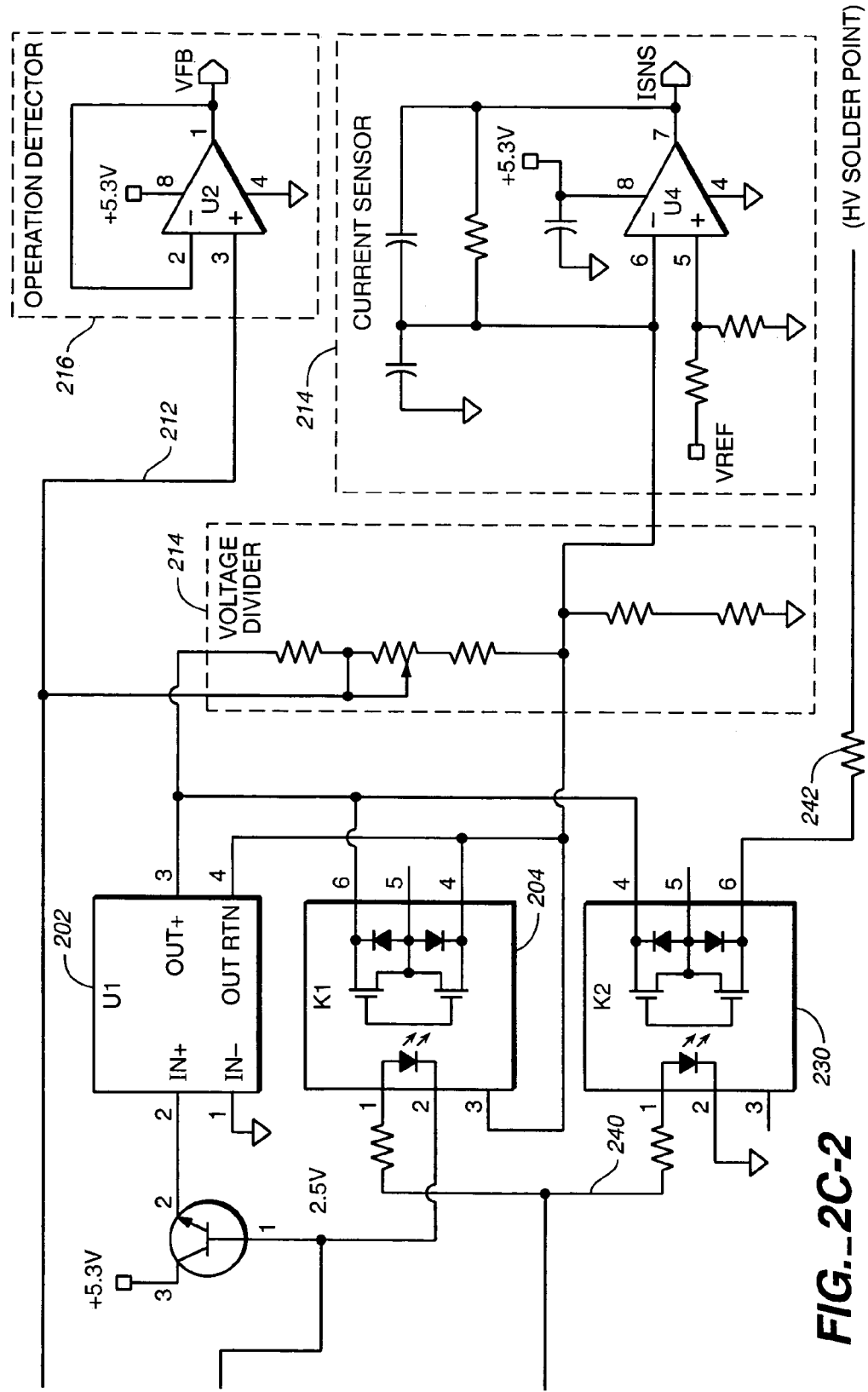
FIG._2C-2

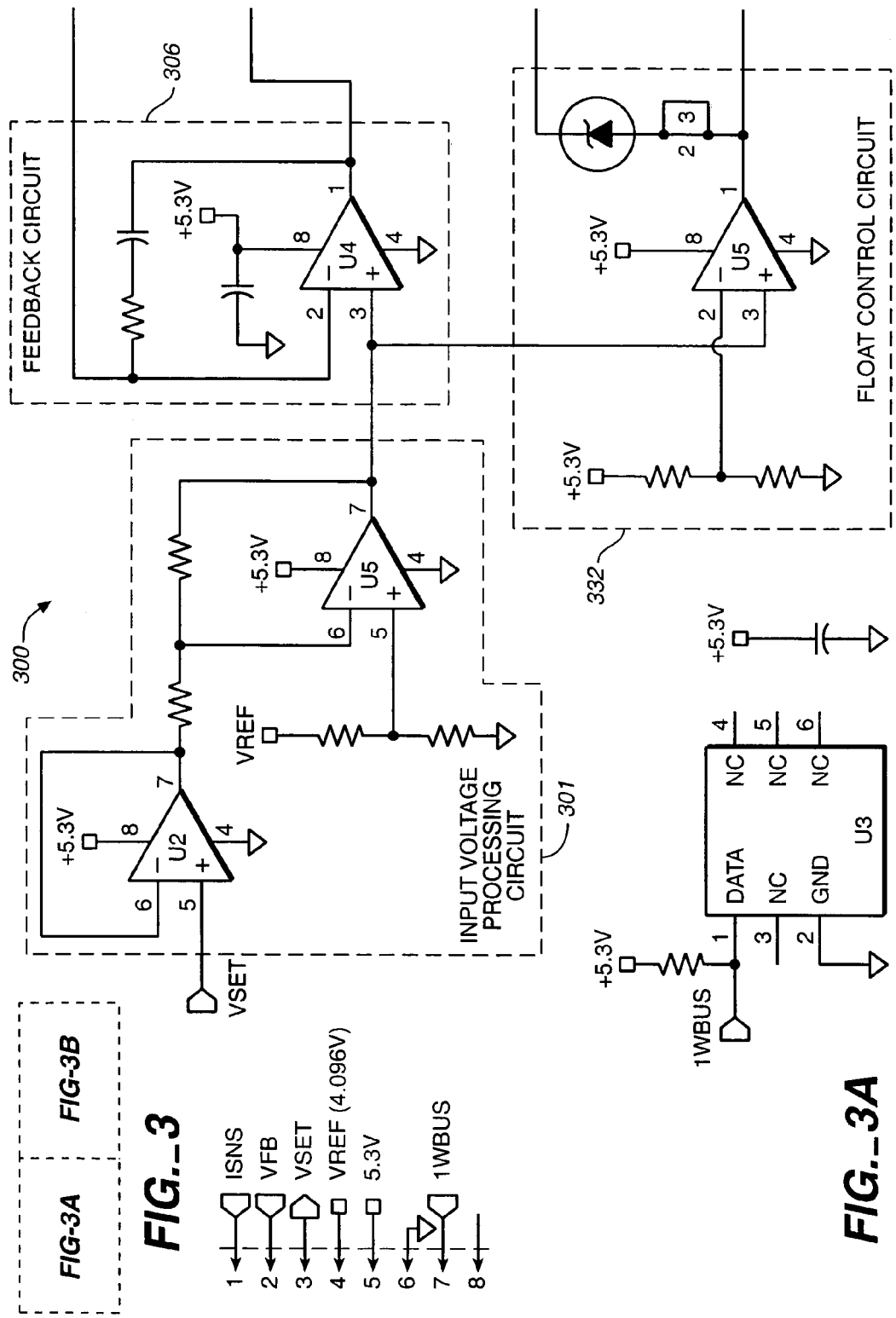

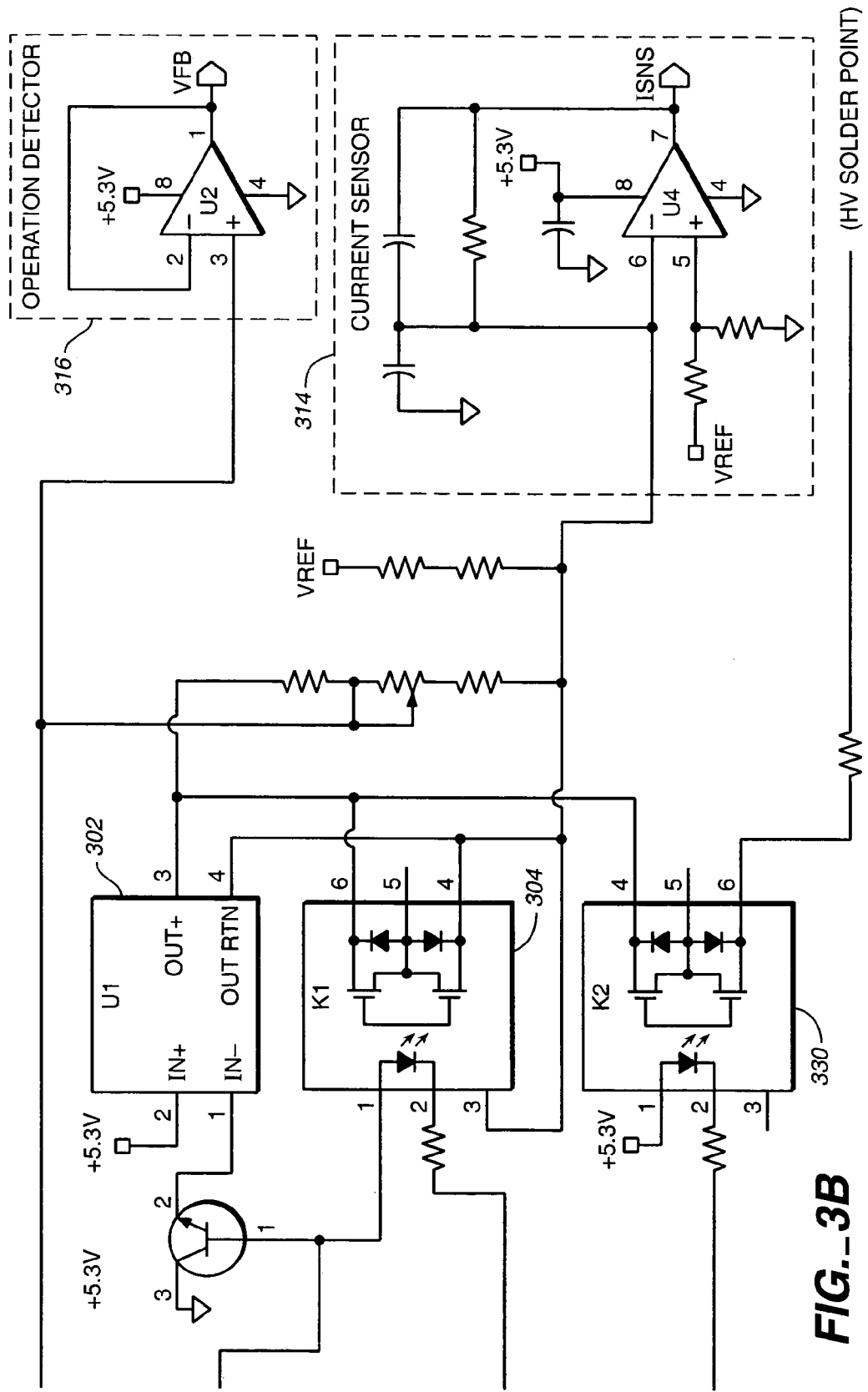
FIG._3B

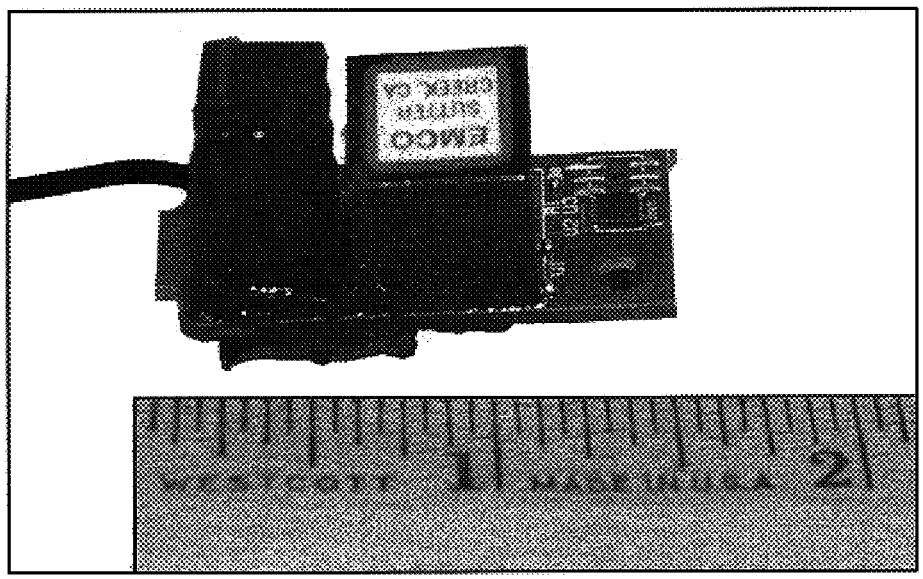
FIG._4A
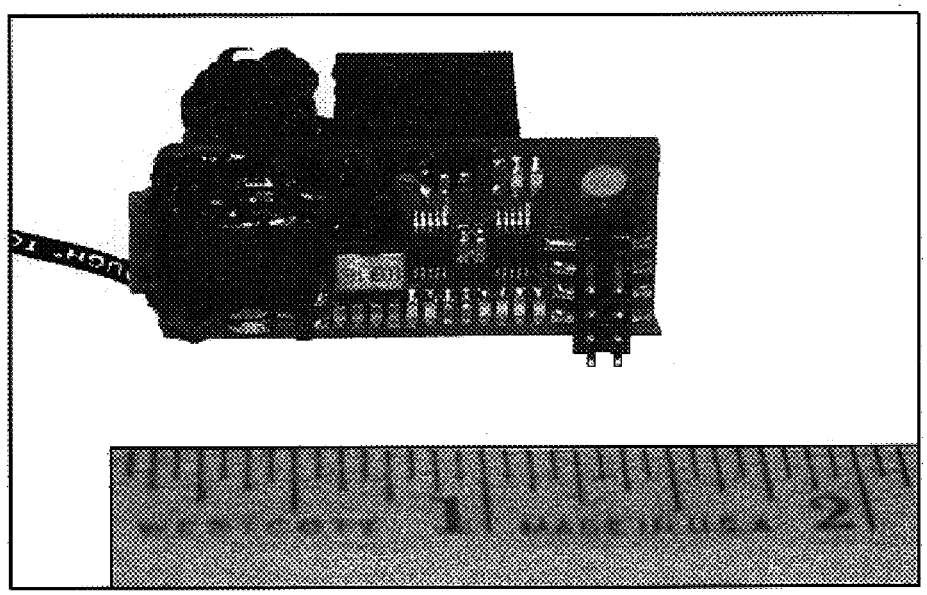
FIG._4B

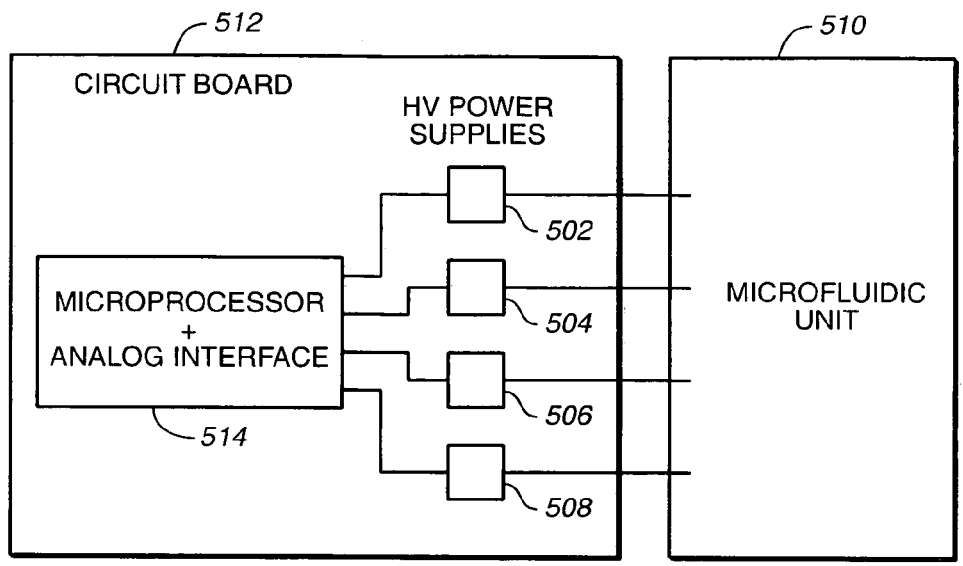
FIG._5
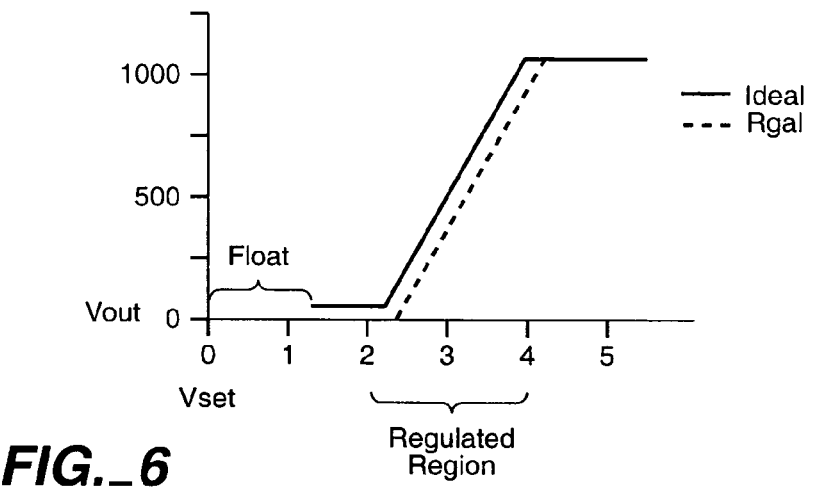
FIG._6
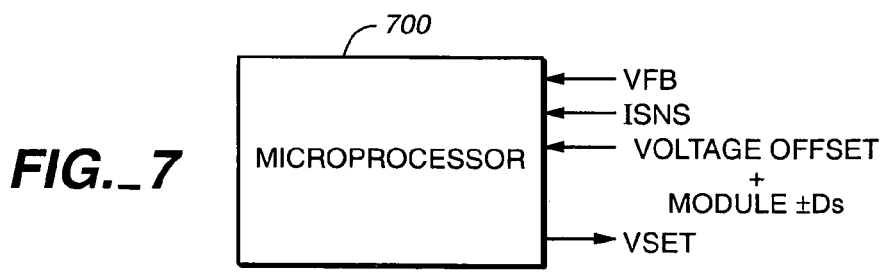
FIG._7

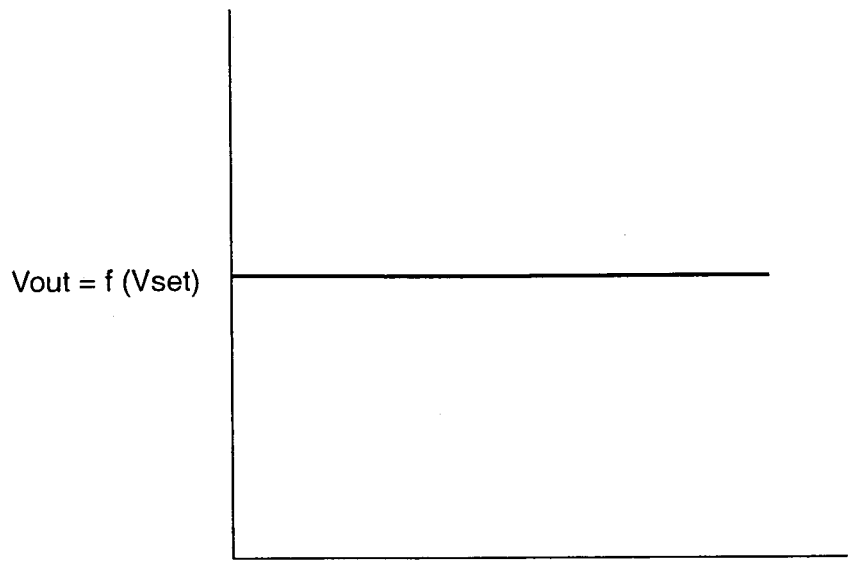
FIG._8
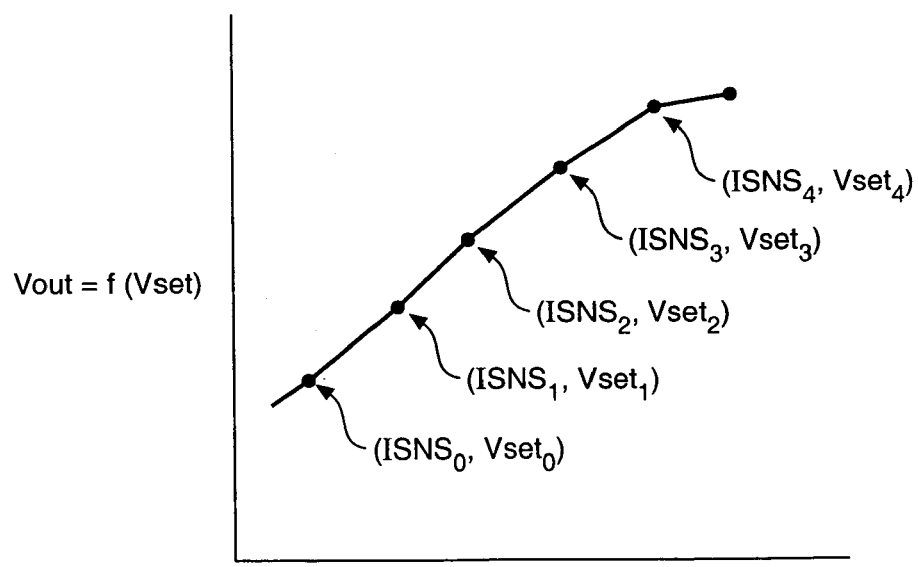
FIG._9

MODULAR HIGH VOLTAGE POWER SUPPLY FOR CHEMICAL ANALYSIS

REFERENCE TO RELATED APPLICATION

This application is a divisional application of U.S. patent application Ser. No. 10/414,979, now U.S. Pat. No. 7,161,334, that was filed on Apr. 16, 2003.

This invention was made with Government support under Contract No. DE—AC04-94AL85000 awarded by the U.S. Department of Energy to Sandia Corporation. The Government has certain rights to the invention, including a paid-up license and the right, in limited circumstances, to require the owner of any patent issuing in this invention to license others on reasonable terms.

FIELD OF THE INVENTION

The present invention relates to high voltage power supplies such as those used in microfluidic systems for chemical analysis.

BACKGROUND

Microfluidics is the science dealing with manufacturing and operating devices and processes using very small volumes of liquids. Microfluidics systems operate at such small scales that the system behavior is dramatically altered. For example, capillary action changes the way liquid flows through microscopic-diameter tubes.

Microfluidics systems have diverse and wide spread applications. Microfluidics systems include microchips or substrates that have networks that are connected by channels which have mesoscale dimensions, where at least one dimension is usually between 0.1 microns and 500 microns. Such substrates may be fabricated using photolithographic techniques similar to those used in the semi-conductor industry, and the resulting devices can be used to perform a variety of sophisticated chemical and biological analytical techniques. Some of the processes that use this technology include ink jet printers, blood cell separation equipment, biochemical assays, chemical synthesis, genetic analysis, drug screening, surface micromachining, laser ablation and mechanical micromilling.

Many microfluidics systems use electrokinetic (EK) pumping of fluid. These applications generally require a high voltage at a low current. Typically large expensive laboratory power supplies are used for such microfluidics systems. Such laboratory power supplies are available from Bertran Associates of Hicksville, N.Y. and Stanford Research Systems (SRS) of Sunnyvale, Calif. The size and expense of such high voltage power supplies reduce the desirability of these power supplies for use in microfluidics systems that use EK pumping.

BRIEF SUMMARY

One embodiment of the present invention is a high voltage power supply comprising a DC-DC converter, and a voltage-controlled resistor. The high voltage power supply also includes a feedback circuit that controls the voltage-controlled resistor and DC-DC converter so as to regulate the voltage output of the high voltage power supply and to allow the high voltage power supply to source or sink current while maintaining the voltage output constant.

BRIEF DESCRIPTION OF THE DRAWINGS

FIGS. 1A and 1B are diagrams of a microfluidics system that can use the high voltage power supply of the present invention.

FIGS. 2A-2C are diagrams of a high voltage power supply of one embodiment of the present invention.

FIG. 3 is a diagram of a high voltage power supply of one embodiment of the present invention.

FIGS. 4A and 4B are diagrams of a high voltage power supply module of one embodiment of the present invention.

FIG. 5 is a diagram illustrating the use of high voltage power supply modules of one embodiment of the present invention.

FIG. 6 is a diagram illustrating an exemplary input voltage versus output voltage curve of a high voltage power supply of one embodiment of the present invention.

FIG. 7 is a diagram illustrating signals sent from and received by a processor in one embodiment of the present invention.

FIG. 8 is a diagram that illustrates output voltage versus output current for a fixed voltage embodiment of the present invention.

FIG. 9 is a diagram of output voltage versus output current following a predetermined curve for one embodiment of the present invention.

DETAILED DESCRIPTION

FIGS. 1A and 1B illustrate the use of a high voltage power supply of one embodiment of the present invention used in a microfluidics system. The electrokinetic pumping of fluids for chemical analysis requires a high voltage with a low current. Looking at FIG. 1A, the power supplies 102 and 104 are used to draw a sample 106 in a tube portion 105 between the power supplies, 108 and 110. For example, power supply 102 can be set to 900V and power supply 104 can be set 0V, while power supplies 108 and 110 are set to 300V or floated. Once the sample 106 is loaded into the tube portion 105, the power supplies 108 and 110 cause plug 107 to move down the tube 105. For example, power supply 110 can be set to 5000V and power supply 108 can be set to ground, while the power supplies 102 and 104 are set to 250V or floated. This causes plug 107 to move toward power supply 110. Based upon the weight or size of the components in the plug 107, different components take different amounts of time to get to the sensor, such as laser 112 and detector 114. The sensor will detect peaks as the components pass by. This gives an indication of the composition of the material in the plug 107. The measurement resolution, sensitivity and repeatability are greatly affected by the plug shape and speed, which in turn are affected by the current flow and applied voltages.

In one embodiment, the high voltage power supply of the present invention is designed to have special features to help obtain optimal analysis results, and to diagnose chemistry and electrical problems when they occur. Additionally, the modularity and small size of one embodiment of the high voltage power supply of the present invention allows it to be used in a wide variety of applications and simplifies the reconfiguration of the experimental set up, thus saving time and money.

Although the system of the present invention can be useful for electrokinetic pumping in microfluidics systems, it also can be valuable for many other scientific and engineering applications, such as photomultiplier tube supplies, ion mobility spectroscopy, microseparations, and charged particle acceleration.

As used herein a "microfluidics system" includes one or more substrates (also commonly known as microchips and microwafers) that perform a variety of chemical and/or biological analytical operations, including, for example, protein separations, fluidic mixing, dispensing, valving, reactions, and/or detections involving very small sample sizes. The sample volumes can range in the nonoliters or less. Substrates can include microfluidic members that have integrated networks of microfluidic channels disposed therein. The substrate may include reaction cells, reservoirs, and other structures that are interconnected by the network. The substrate is preferably fabricated from glass, quartz, silicon or plastic by conventional techniques including LIGA (an acronym for the German for lithography, electroplating, and molding), deep x-ray lithography, silicon surface micromachining and lithography, electric discharge machining, and direct laser additive fabrication. Substrates are also commercially available. Substrates and related accessories are further described in U.S. Pat. Nos. 6,358,387 to Kopf-Sill et al., 6,224,728 to Oborny et al., 6,083,763 to Balch, and 5,846,396 to Zanzucchi et al., which are incorporated herein.

FIG. 2A illustrates a high voltage power supply 200 of one embodiment of the present invention. The high voltage power supply 200 has a DC-DC converter 202 and a voltage controlled resistor 204. In one embodiment, the DC-DC converter 202 and a voltage-controlled resistor 204 are connected in parallel. The DC-DC converter 202 can be for example an EMCO DC-DC converter such as a Q50 or Q10 model which is available from the EMCO High Voltage Corporation of Sutter Creek, Calif. DC-DC converters produce a high voltage output based on a low voltage input. The DC-DC converters are typically unregulated meaning that the current drawn from the output of the DC-DC converter can reduce the output voltage from its nominal value. The voltage-controlled resistor 204 can be a photo relay, such as the photo MOS relays available from the Aromat Corporation (Matsushita Electric Works America) of New Providence, N.J.

A feedback circuit 206 can control the DC-DC converter 202 and the variable voltage controlled resistor 204 so as to regulate the output of the high voltage power supply 200. In one embodiment, the feedback circuit 206 alternately powers voltage-controlled resistor 204 or DC-DC converter 202. When the high voltage power supply output is too high, the DC-DC converter is powered down and the voltage-controlled resister 204 is turned on to reduce the output at point 210. When the high voltage power supply output is too low, the DC-DC converter is powered up and the voltage-controlled resistor 204 is turned off.

In one embodiment, feedback circuit 206 sets the output of the high voltage power supply 210 to be some function of the input voltage. In one embodiment, the feedback signal on line 212 is compared to the input voltage, VSET. If the feedback signal voltage is greater than VSET then the output of the feedback circuit adjusts voltage so that voltage-controlled resistor 204 is powered up and thus reduces the output voltage. If the feedback signal is less than VSET then the DC-DC converter 202 is powered on thus raising the output voltage of the high voltage power source and thus the feedback signal. The feedback circuit 206 forces the feedback signal 212 to be approximately equal to VSET by changing the output voltage 210. This results in the output on line 210 of the high voltage power supply to be a function of the input voltage. In one embodiment, a voltage divider 213 is used to set the feedback signal on line 212 to be a function of the output voltage.

The DC-DC converter 202 and the voltage-controlled resistor 204 allow for the high voltage power supply 200 to source or sink current. When the current is flowing into the output line 210, the voltage at line 210 rises slightly above the desired voltage, causing an increase in the feedback signal in line 212, which causes the voltage-controlled resistor 204 to turn on, lowering the output voltage until it is approximately equal to the desired voltage. When the high voltage power supply 200 sources current, the voltage at 210 drops slightly below the desired voltage causing a reduction in the feedback signal on line 212 which causes the DC-DC converter 202 to be powered up, resulting in a rise in the output voltage on line 210 until it is approximately equal to the desired voltage.

In one embodiment, the high voltage power supply 200 also includes a current sensor 214. The current sensor 214 produces an output voltage signal proportional to the current that flows out of the high voltage power supply 200. Operation detection unit 216 produces an indication of the feedback signal, which is a function of the output voltage of the high voltage power supply 200. The example of FIG. 2A also includes a voltage follower transistor 218 positioned between the feedback circuit 206 and the DC-DC converter 202, to provide a current sufficient to drive DC-DC converter 202.

A photo relay, such as the photo MOS relay shown in FIG. 2A, is one example of a voltage-controlled resistor. When current flows between pins 1 and 2 of the photo MOS relay, the photodiode between pins 1 and 2 emits light, which causes a current flow in the switches between pins 4 and 6 thus reducing the resistance between pins 4 and 6. The optical coupling provides the required electrical isolation between the input and output of the voltage-controlled resistor.

FIG. 2B illustrates an embodiment which also uses an element 230, such as a voltage-controlled resistor to set the output to float (disconnect from the DC-DC converter and the other voltage-controlled resistor). The float control circuit 232 sets the voltage-controlled resistor 230 on during normal operations; when float operation is needed, the voltage-controlled resistor 230, can be turned off. In one embodiment, the float control circuit 232 includes the same input as the feedback circuit 206. This reduces the number of control inputs required for the high voltage power supply 200.

FIG. 2C illustrates examples of the details of a positive high voltage supply 200 of one embodiment of the present invention. The circuit of FIG. 2C generates a variable potential up to +5 KV as a function of the control voltage applied to the VSET pin. The circuit can source current, sink current, or float its output. Additionally with its bipolarity current monitor function and rapid feedback response (20 mS), the circuit can provide constant current operation when used with an external feedback system. A monitor function is included as a diagnostic aid.

Feedback circuit 206 is used to servo-control the output voltage of high voltage DC-DC converter 202 (when sourcing current) or voltage-controlled resistor 204 (when sinking current). In one embodiment, the output voltage is 2000 times the control voltage VSET minus an offset of 1.536V. In one embodiment, the feedback circuit has an operational amplifier that functions as the error amplifier for the feedback circuit. Unit 230 disconnects the entire circuit from the output line when VSET is less than 1.30V. With VSET between 1.30V and 1.536V, the output will be 1.536V. The voltage regulator of the float control circuit 232 generates a bias of 2.5V for the voltage-controlled resistor 204, so that it does not begin to conduct until the error amplifier output is below 1.2V. This assures that the DC-DC converter 202 (which turns on with feedback circuit output VO=1.4V) and the voltage-controlled resister 204 are not on simultaneously.

The current sensor 214 drives an output signal ISNS, to a voltage equal to 20,000 times the output current (in Amps) plus an offset of 2.048V. Zero output current is indicated by ISNS equal to 2.048V, +100uA by 4.048V, and −100uA by 0.048V. In one embodiment, float control circuit 232 includes an operational amplifier that serves as the float switch comparator.

Resistor 242 limits the output energy delivered during a short so that the sensitive board components are not damaged by latch-up during an accidental arc.

The circuit of the example of FIG. 2C uses three voltages: +5.3V for power, a reference of 4.096V (VREF), and a control voltage (VSET). A power voltage slightly higher than 5V is needed to assure a 5000V output from DC-DC converter 202 with rated load current up to 100 uA. The 4.096V reference can be eliminated from the interface if a reference circuit is included on the high voltage power supply module. Where many high voltage power supplies are used in the same system, a single reference on the motherboard can save space and power on each power supply module.

The schematic of FIG. 2C can be used to build a +5 KV or a +1 KV version of the circuit depending on the DC-DC converter model and the component values loaded on the PC board. Values in parentheses are to be used on the +1 KV version, in which case the output voltage is equal to 500 times VSET minus 2.048V. The DC-DC converter is a model Q10-5 in this case instead of a Q50-5. A memory such as a serial EEPROM allows a processor, such as a microprocessor, to identify the number and type of high voltage power supply modules in a system and adjust scaling factors and offsets accordingly.

FIG. 3 illustrates a negative high voltage power supply. In this example, an input voltage processing circuit 301 is used to process the input voltage into a range more conveniently used by the high voltage power supply 300. In one embodiment, it is desirable that the DC-DC converter 302 is not turned on when the system is first powered up and the control input to the high voltage power supply is low. In one embodiment, the input voltage processing circuit 301 inverts the voltage VSET at the input of the feedback circuit about 2.048 volts. This means that a 4.048 volt value at the input processing circuit 301 produces a 0.048 volt input to the feedback circuit 306 and float control unit 332. The DC-DC converter 302 is turned on when the feedback circuit output 306 is less than 3.9V. The voltage-controlled resistor 304 is turned on when the output of the feedback circuit is greater than 4.1 V.

Output voltages for the examples of FIGS. 2 and 3 are given below.

Float Range
Vout=FLOAT for VSET<1.3V (±1000V & ±5000V)
Zero Volt Range
Vout=1.536V for 1.30≦1.536V (±5000V Version)
Vout =2.048V for 1.30≦VSET ≦+2.048V (±1000V Version)
Regulated Range
Vout=2.048V+500×(VSET−2.048V) for 2.048V≦VSET≦4.048V (±1000V)
Vout=1.536V+2000×(VSET−1.536V) for 1.536V≦VSET≦4.048V (±5000V)

The polarity of Vout will be positive for the circuit of FIG. 2 and negative for the circuit of FIG. 3.

FIG. 4A illustrates a top view of a module containing a high voltage power supply of one embodiment. FIG. 4B illustrates a bottom view of the module of FIG. 4A. The DC-DC converter shown on the module is an EMCO unregulated DC-DC converter. The components are mounted on a circuit board to form the module interconnecting the elements of the power supply. In the 5 KV version of one embodiment, the module is covered with high voltage insulating sealer. This is done to prevent arcing of the high voltage areas to other areas on the circuit board. Most silicone-based sealers, such a high General Electric RTV 167 or the more commonly available General Electric Silicone II Gasket and Seal (GE283) will work for this application. Silicone-based high temperature automotive blue gasket seal will also work.

The module can be less than 2 in. (50.1 mm)×2 in. (50.1 mm)×2 in. (50.1 mm) in size. In the 5 KV embodiment, the module formed with a high voltage supply has a size of 1.45 in. (36.8 mm)×0.6 in. (15.2 mm)×1.0 in. (25.4 mm). In the 1 KV embodiment, the module has a size of 1.45 in. (36.8 mm)×0.6 in. (15.2 mm)×0.8 in. (20.3 mm). The small size of the module is an advantage in systems, such as microfluidics systems, because the small size aids in the portability and ease of use of the system.

FIG. 5 illustrates modules 502, 504, 506 and 508 on a circuit board 512. The circuit board 512 allows the interconnection of the modules 502, 504, 506 and 508 to the microprocessor 514. In one embodiment, the modules plug into the circuit board for easy replacement and repair. Using a memory on each module can allow the processor 514 to determine which type of power supply is plugged into which location in the circuit board 512.

FIG. 7 illustrates a microprocessor 700 with input and output signals. The inputs can include the feedback signal voltage, the output of the current sensor, as well as info from a memory on the module. Microprocessor 700 can be associated with A/D converters that can be internally or externally located.

FIG. 6 illustrates an example of the output voltage of a +1 KV high voltage power supply. The float region, in this example is from 0 to 1.3 volts. Between 1.3 volts and 2.048 volts input, the output is 2.048 volts. Above 2.048 volts, is the regulated region. In this example, the ideal curve is shown with a solid line and the dotted line shows an example of experimentally determined values. In one embodiment, the voltage offset and module ID are stored in the memory of the high voltage power supply. As shown in FIG. 7, the processor can receive identifiers and offsets from a memory on the module to allow a more accurate indication of the voltage curve. As shown in FIG. 7, the input and the feedback voltage and the current sensor output can be used to set the VSET.

Typically the VSET values are constant to produce a constant voltage output for different currents. FIG. 8 illustrates the case where the output voltage is set to the constant value.

Any type of current/voltage transfer function can be produced with the external processor. FIG. 9 shows an example of a voltage output/current output transfer function curve. The current sensor output can be used by the processor to calculate a new VSET. As the current changes, the input voltage is modified to fit the transfer function curve.

In one embodiment, the module can be controlled so that the VSET values are modified to keep the output current constant. As the output current rises, the input voltage, VSET is decreased by the processor to correct the change in current. If the output current is decreased, the voltage output can be increased by the processor to bring the current back to the desired value.

One embodiment of the present inventions uses a single power supply. In one example, a 4.096V reference is used, but a negative power supply rail is not used. In this example, a −5V supply is not needed—only a +5V (+5.3V) input voltage. One embodiment uses low current consumption for battery-power operation. This embodiment also has low heat dissipation. In a float mode, one embodiment only requires 80 μA from its 5.3V line. In one embodiment, the negative and positive polarity versions share a common electrical control interface. This makes the modules interchangeable in multi-module systems.

The foregoing description of preferred embodiments of the present invention has been provided for the purpose of illustration and description. It is not intended to be exhaustive or to limit the invention to the precise forms disclosed. Many modifications and variations will be apparent to one of ordinary skill in the relevant arts. The embodiments were chosen and described in order to explain the principles of the invention and its practical application, thereby enabling others skilled in the art to understand the invention for various embodiments and with various modifications that are suited to the particular use contemplated. It is intended that the scope of the invention by defined by the claims and their equivalence.

The invention claimed is:

1. A high voltage power supply comprising:
   DC-DC converter having a low voltage input to which an input current is applied and a high voltage output at which an output current and an output voltage are developed;
   a voltage controlled resistor being electrically coupled to said high voltage output in parallel with said DC-DC converter and having a control input wherein a resistance of said voltage controlled resistor is determined by an input voltage applied to said control input of said voltage controlled resistor; and
   a feedback circuit operatively connected between said high voltage output of said DC-DC converter and said control input of said voltage controlled resistor, said feedback circuit being responsive to each of a reference voltage and a feedback signal proportional to said output voltage and operative to develop said input voltage which varies as a function of variation in said feedback signal, said voltage controlled resistor in response to variation of said input voltage being operative to vary said resistance such that variation of said resistance is in opposition to a variation of said output voltage to maintain said output voltage substantially constant.

2. A high voltage power supply as set forth in claim 1 further comprising:
   a memory in which readable information relating to voltage conversion curves of said DC-DC converter is stored;
   an operation detection unit that develops a voltage proportional to said output voltage; and
   a current sensor that develops a voltage proportional to said output current, said reference voltage being developed by a microprocessor in response to each of said voltage developed by said operation detection unit and said voltage developed by said current sensor in accordance with said information to maintain said output current constant.

3. A high voltage power supply as set forth in claim 2 wherein said feedback signal is applied to said operation detection unit, said operation detection unit developing said voltage proportional to said output voltage in response to said feedback signal.

4. A high voltage power supply as set forth in claim 2 further comprising a microprocessor, said information stored in said memory being readable by said microprocessor, said microprocessor being operative to develop said reference voltage in response to each of said voltage developed by said operation detection unit and said voltage developed by said current sensor in accordance with said information to maintain said output current constant.

5. A high voltage power supply as set forth in claim 4 wherein said information stored in said memory is an output voltage/output current curve of said DC-DC convert and further wherein said microprocessor develops said reference voltage to maintain said output voltage and said current commensurate with said output voltage/output current curve.

6. A high voltage power supply as set forth in claim 2 wherein said current sensor has an input at which said output current is sensed, said input of said current sensor being maintained at a fixed voltage to form a virtual ground.

7. A high voltage power supply as set forth in claim 1 further comprising a voltage divider being electrically connected in parallel with said voltage controlled resistor and said DC-DC converter, said voltage divider being operative to develop said feedback signal as a function of said output voltage wherein said feed back signal is applied to said feedback circuit.

8. A high voltage power supply as set forth in claim 7 wherein said feedback circuit is operative to compare said feedback signal to said reference voltage to develop said input voltage.

9. A high voltage power supply as set forth in claim 8 wherein said feedback circuit is an operational amplifier operative to develop said input voltage as a difference between said reference voltage and said feedback signal.

10. A high voltage power supply as set forth in claim 1 further comprising a current generator being responsive to said input voltage developed by said feedback circuit and being operative to develop said input current applied to said input of said DC-DC converter wherein said input current varies with variation of said input voltage such that variation of said input voltage is in opposition to variation of said output voltage to maintain said output voltage substantially constant.

11. A high voltage power supply as set forth in claim 10 wherein said current generator includes a voltage follower transistor having a normally biased collector, an emitter at which said input current is developed, and a base to which said input voltage is applied.

12. A high voltage power supply as set forth in claim 1 wherein said voltage controlled resistor is an MOS photo relay having a photo diode to which said input voltage is applied and a pair of series connected MOS switches defining said resistor, said photodiode emitting light in response to said input voltage wherein variation in said input voltage causes a corresponding variation in said light, said switches being operative to develop a current in said switches proportionally in response to said light such that said current in said switches determines said resistance of said voltage controlled resistor.

13. A high voltage power supply as set forth in claim 12 wherein said photodiode has a normally biased anode and a cathode to which said input voltage is applied.

* * * * *